United States Patent [19]

Cadwell, Jr.

[11] Patent Number: 4,608,066

[45] Date of Patent: Aug. 26, 1986

[54] CLEAN ROOM ADAPTED FOR VARIABLE WORK AREA CONFIGURATIONS

[75] Inventor: George H. Cadwell, Jr., Bounts Creek, N.C.

[73] Assignee: Flanders Filters, Inc., Washington, N.C.

[21] Appl. No.: 760,501

[22] Filed: Jul. 31, 1985

[51] Int. Cl.⁴ .............................................. B01D 25/22
[52] U.S. Cl. .................... 55/385 A; 55/473; 55/484; 55/502; 55/DIG. 29; 98/31.5; 98/34.5; 98/40.1; 52/239; 52/241
[58] Field of Search .............. 55/355, 385 A, 473, 55/484, 502, DIG. 29; 98/31.5, 34.5, 40.1; 52/238–241, 39

[56] References Cited

U.S. PATENT DOCUMENTS

| | | |
|---|---|---|
| 3,277,638 | 10/1966 | Soltis . |
| 3,486,311 | 12/1969 | Allan, Jr. ............................... 55/355 |
| 3,601,031 | 8/1971 | Abel et al. . |
| 3,782,265 | 1/1974 | Pielkenrood et al. . |
| 3,986,850 | 10/1976 | Wilcox ................................... 55/355 |
| 4,081,931 | 4/1978 | Miyoshi . |
| 4,245,442 | 1/1981 | Durham ................................. 52/241 |
| 4,304,174 | 12/1981 | Hickson et al. . |
| 4,459,790 | 7/1984 | Vermillion ............................. 52/241 |

FOREIGN PATENT DOCUMENTS 2617328 11/1976 Fed. Rep. of Germany .......... 52/39

*Primary Examiner*—Bernard Nozick
*Attorney, Agent, or Firm*—Bell, Seltzer, Park & Gibson

[57] ABSTRACT

A clean room is disclosed which has a capability of being divided into separate work areas of predetermined size, and with the separate work areas being effectively isolated from each other to prevent cross contamination. The clean room comprises a filter bank composed of a supporting latticework and a plurality of filters, with the latticework being supported by tie rods which extend through the latticework. A plurality of wall panels are supported below the latticework, and are attached directy to the tie rods so that the weight of the wall panels is not borne directly by the tie rods and by the latticework. Also, the latticework and wall panels are effectively isolated from external vibrations, by means of a flexible sealing strip between the periphery of the latticework and the bounding side walls of the clean room, and by the fact that the wall panels are free of any connection with the floor of the clean room.

12 Claims, 9 Drawing Figures

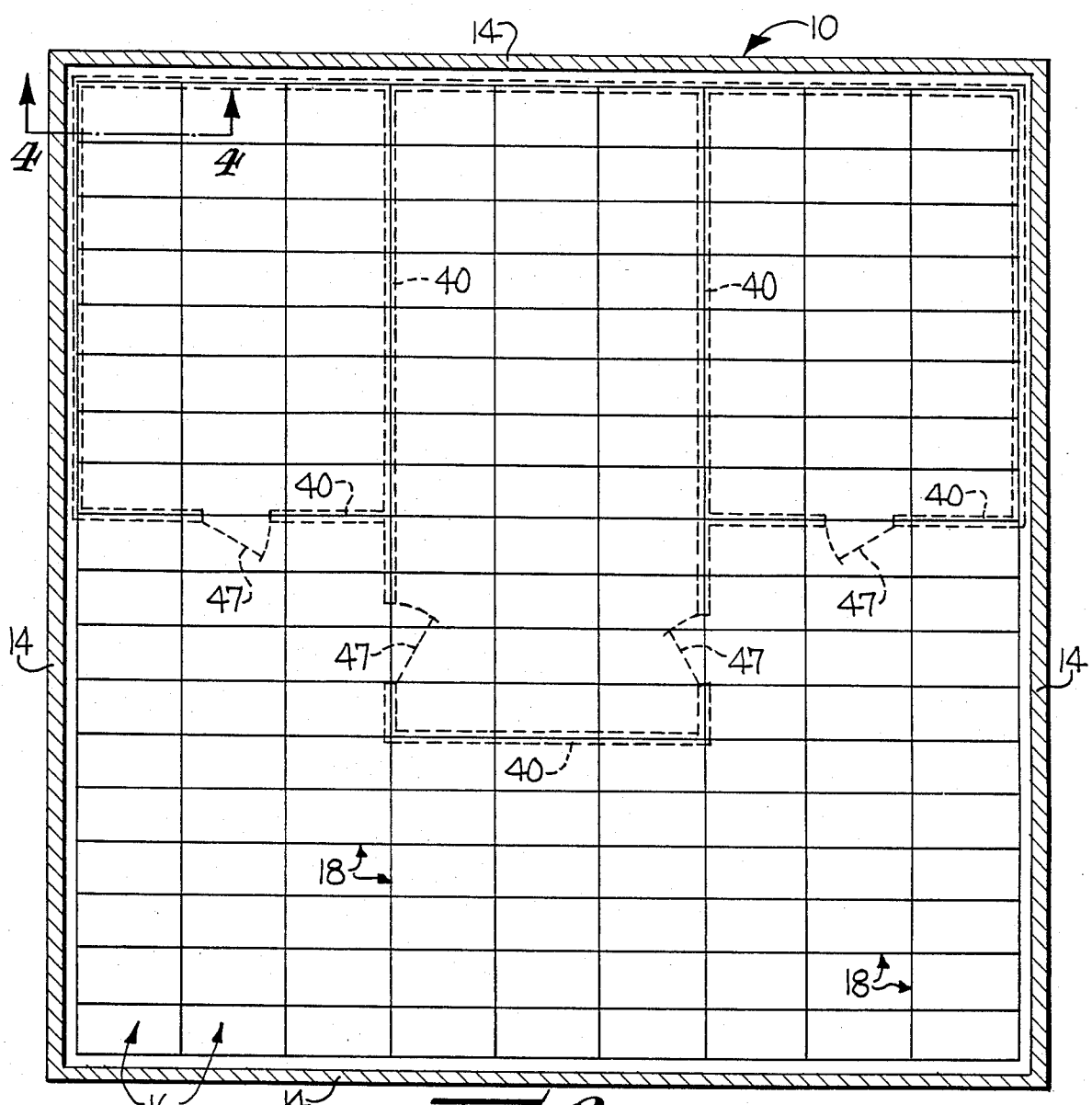
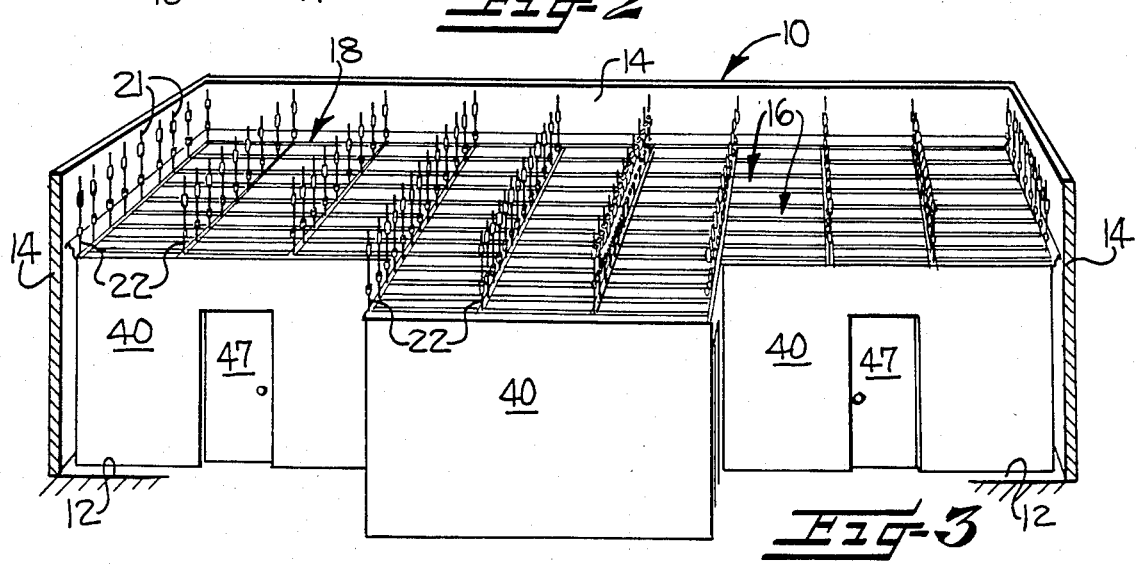

CLEAN ROOM ADAPTED FOR VARIABLE WORK AREA CONFIGURATIONS

The present invention relates to a clean room characterized by the ability to be divided into separated work areas of variable configurations and which may be isolated from external room vibrations.

In U.S. Pat. No. 3,486,311 to Allan, which is commonly owned with the present invention, there is disclosed a filter bank assembly for a vertical laminar flow clean room, and which comprises a horizontally suspended rectangular latticework composed of interconnected U-shaped channels, and which sealably support the filters thereupon. It has also been proposed to modify the clean room of the type shown in the Allan patent by bolting depending temporary walls to the latticework to provide separated work areas within the room and which are of variable configuration. However, this has not been found to be totally satisfactory, since the latticework is of a relatively lightweight metallic construction, and the bolting of relatively heavy wall panels to the latticework tends to bow the latticework, thereby tending to destroy the seal between the latticework and the filters.

It is accordingly an object of the present invention to provide a clean room which may be divided into separated work areas of variable configuration, and which includes a plurality of wall panels which are suspended downwardly from the latticework without imparting bending stress to the latticework.

It is another object of the present invention to provide a clean room capable of being divided into separated work areas of variable configuration and which are substantially isolated from external room vibrations.

These and other objects and advantages of the present invention are achieved in the embodiments illustrated herein by the provision of a novel clean room which includes a top wall, a bottom wall and bounding side walls, and a filter bank positioned parallel to and spaced below said top wall. The filter bank comprises a supporting latticework which defines a plurality of rectangular open areas, a plurality of supporting tie rods connected between said top wall of the clean room and the latticework, and a plurality of high efficiency air filters positioned on the latticework, with one of the filters covering each of the open areas. A plurality of wall panels are suspended downwardly from the latticework, and attachment means are provided for releasably supporting each of the wall panels, with each attachment means being disposed coaxially with and operatively connected to one of the tie rods, and such that the weight of suspended wall panels is borne directly by the tie rods and not by the latticework. The wall panels are thus adapted to be positioned within the clean room in a selected configuration to define separated work areas.

In one embodiment of the invention, the tie rods each include a lower end portion which extends through the latticework, and the attachment means comprises an elongate support rod coaxially disposed with and connected to the lower end portion of the associated tie rod, and the support rod extends through the full height of the associated wall panel. Load bearing means are releasably connected to the lower end of each elongate support rod in contact with the lower edge of the associated wall panel in order to support the wall panel.

In another embodiment, each of the wall panels comprises a supporting framework of elongate channel members, and a plurality of sheet members releasably connected to and overlying the elongate channel members of the framework. In this embodiment, the lower end portions of the tie rods also extend through the top channel member, and the attachment means comprises a plate and nut for bolting the top channel below the latticework.

As a further aspect of the present invention, the partitioned clean room may be constructed such that the depending wall panels are isolated from external room vibrations. More particularly, the clean room may further include flexible sealing means disposed between the bounding side walls of the clean room and the periphery of the latticework for effecting an air seal therebetween and while also isolating the filter bank, wall panels and work areas from external room vibrations. Also, the wall panels preferably have a vertical height so as to be spaced above the bottom wall of the clean room, so as to isolate the wall panels from any floor vibrations.

Some of the objects having been stated, other objects and advantages will appear as the description proceeds, when taken in connection with the accompanying drawings, in which—

FIG. 2 is a sectional plan view of a portion of a clean room having a configuration somewhat different from that shown in FIG. 1;

FIG. 3 is a fragmentary front perspective view of the clean room shown in FIG. 2, with the filters removed from the supporting latticework;

Figure 1:
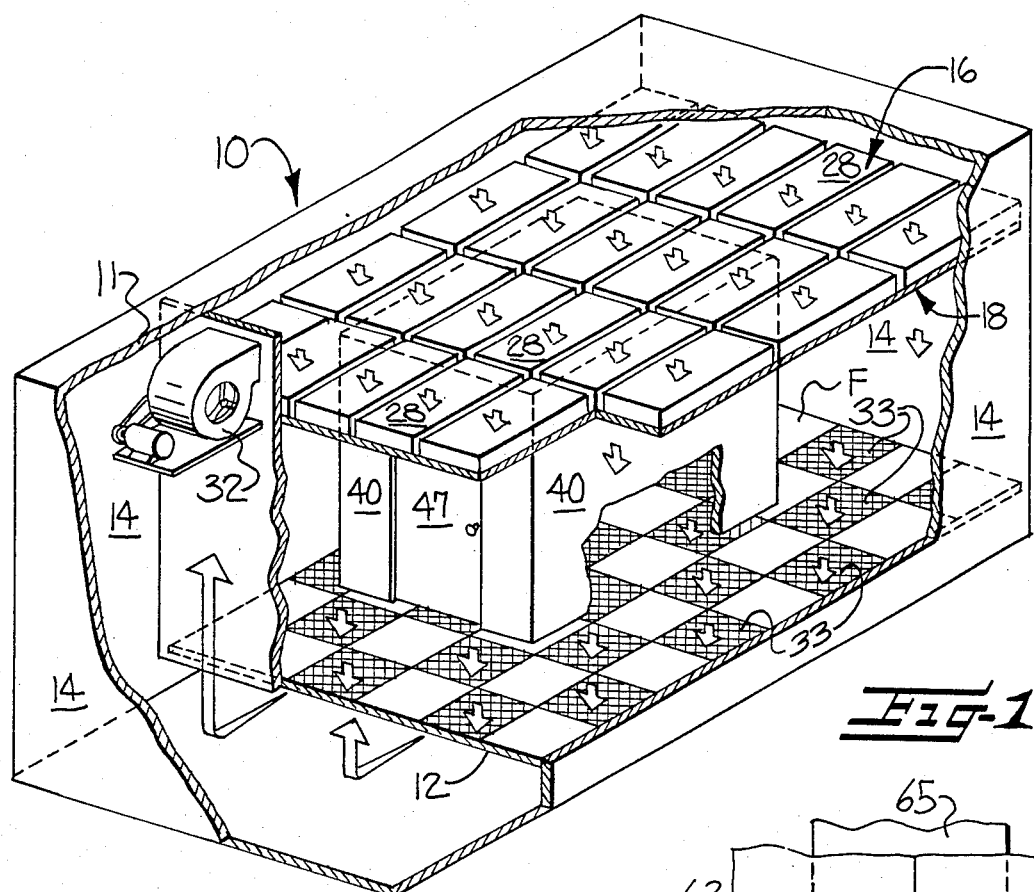
FIG. 1 is a perspective, partly broken away view of the clean room embodying the features of the present invention.
Figure 7:
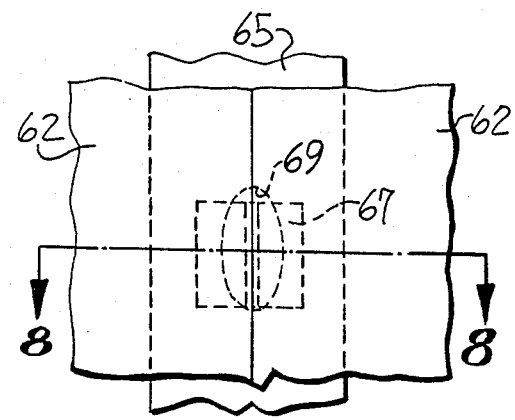
FIG. 7 is a fragmentary side elevation view illustrating the manner in which the wall panels of FIG. 5 are joined to the supporting channel members of the wall panels.
Figure 9:
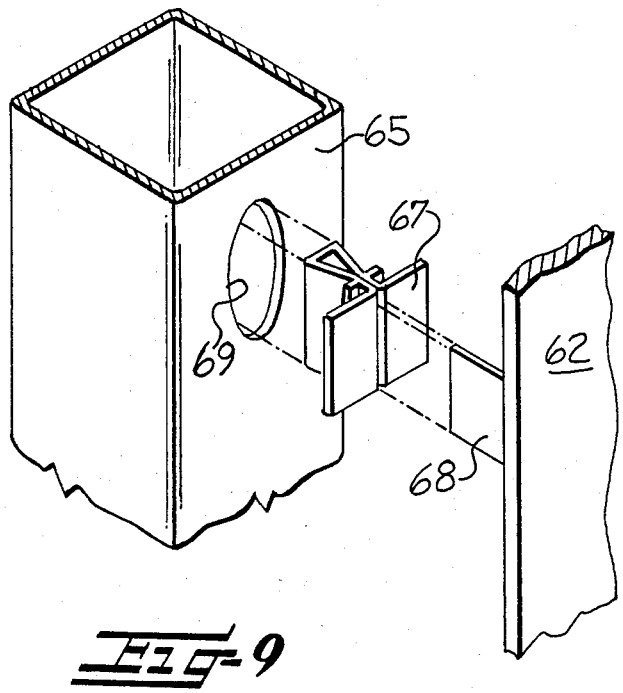
FIG. 9 is an exploded perspective view illustrating the joint shown in FIG. 7.
Figure 4:
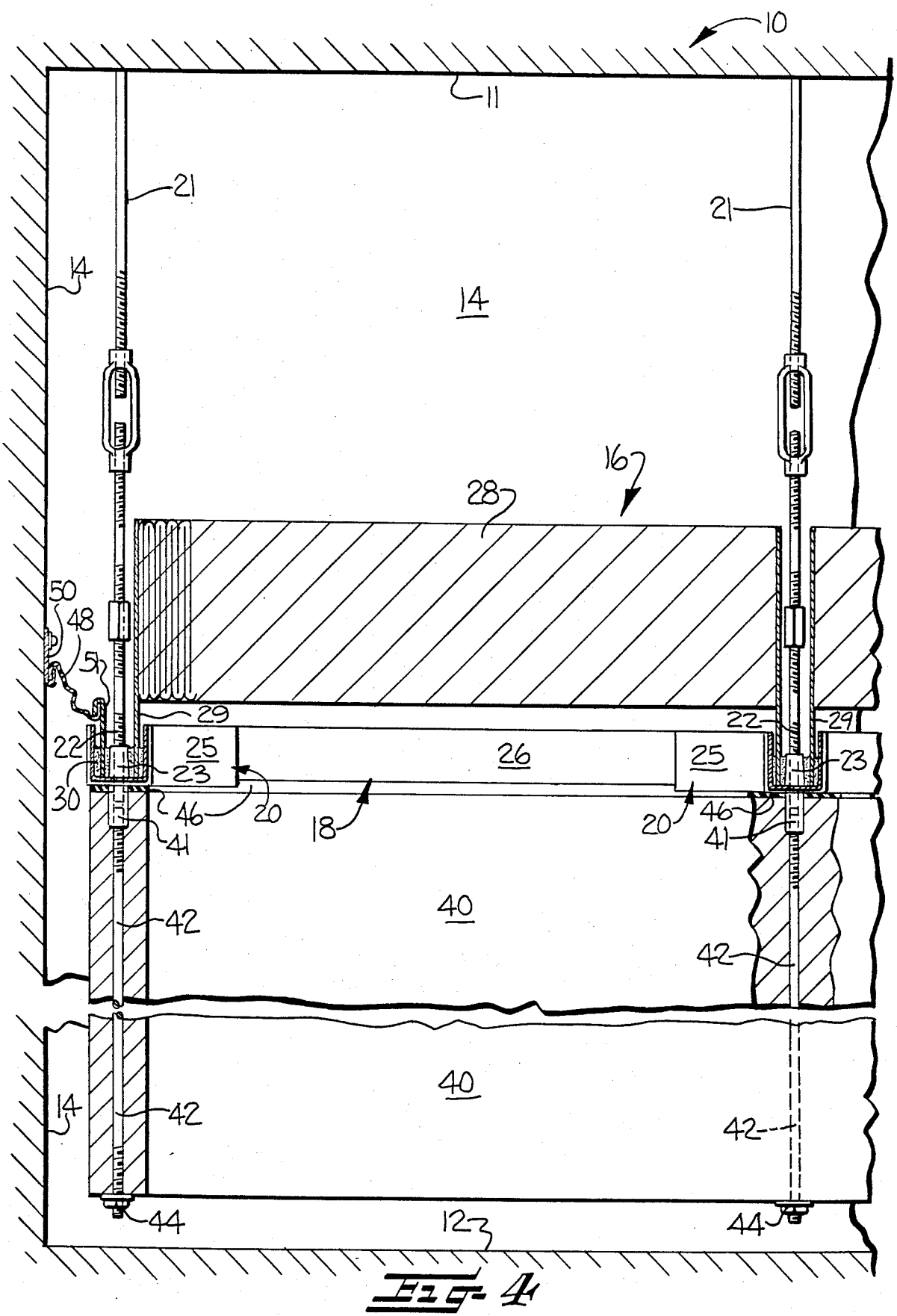
FIG. 4 is a sectional view taken substantially along the lines 4—4 of FIG. 2 and illustrating the structure for attaching the wall panels to the latticework of the filter bank.
Figure 5:
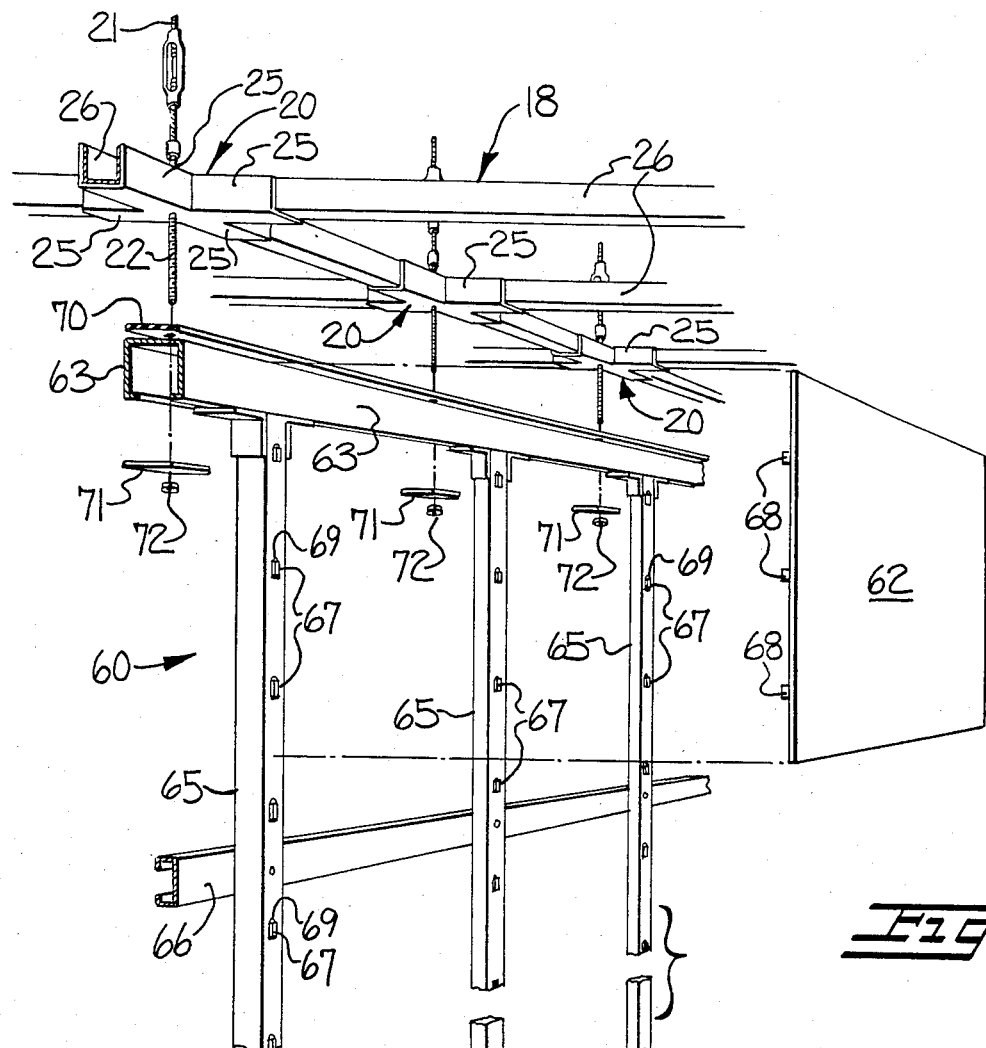
FIG. 5 is an exploded perspective view of a further embodiment of the wall panels of the present invention.

Referring more particularly to the drawings, FIG. 1 illustrates a clean room 10 which embodies the features of the present invention. The clean room includes a top wall 11, a bottom wall or floor 12, and four bounding side walls 14. Also, a filter bank 16 is positioned parallel to and spaced below the top wall, and the filter bank comprises a supporting latticework 18 composed of interconnected lengthwise and crosswise members. More particularly, and as best seen in FIG. 5, the lengthwise and crosswise members are defined by a plurality of X-shaped connectors 20 which are supported from the top wall 11 of the clean room by means of tie rods 21, with each tie rod having a threaded lower end portion 22. Each X-shaped connector 20 includes a centrally disposed boss 23 (FIGS. 4 and 6) for threadedly engaging the lower end portion 22 of the associated tie rod, and the lower end portion of each tie rod extends completely through the boss for the reasons described below. Each connector also includes four extensions 25 which radiate outwardly from a central location and at right angles to each other. Also, each of the extensions 25 has a U-shaped cross-sectional configuration which opens upwardly toward the top wall. U-shaped channels 26 span and are carried between the aligned extensions 25 of the adjacent X-shaped connectors 20. A plurality of filters 28 are supported upon the latticework 18, with each filter 28 covering one of the rectangular open areas defined by the latticework. More particularly, each filter 28 comprises a depending peripheral skirt 29 which is adapted to rest upon the members of the latticework and so as to be embedded in a fluid or gum sealant 30 which is carried within the connectors and channels so as to form an air tight seal therebetween.

The clean room 10 further includes a blower 32 for circulating the air into the plenum formed between the top wall 11 of the room and the filter bank, and then downwardly through the clean room. The floor 12 of the clean room includes grated openings 33, and the air moves through these openings and back to the blower 32 through an underlying plenum in the manner illustrated in FIG. 1. In addition, a plurality of wall panels 40 are suspended downwardly from the latticework so as to define a plurality of separate and enclosed work areas within the clean room in accordance with the present invention.

FIG. 1 illustrates an embodiment wherein the wall panels 40 are arranged to define a single isolated work area within the bounds of the clean room, and FIGS. 2-3 illustrate an embodiment wherein the wall panels define three separate work areas within the room. In each case, the wall panels of the present invention may be selectively moved within the clean room to define still different arrangements of the work areas.

Attachment means are provided for releasably supporting each of the wall panels 40 below and aligned with the associated members of the latticework. As best seen in FIG. 4, this attachment means includes the lower end portion 22 of each tie rod, and which extends completely through the boss 23 of the connector 20. A sleeve 41 is threaded onto this lower end portion, and a support rod 42 extends through the full vertical height of each wall panel, and is threadedly connected to the other end of the sleeve 41. The bottom end of the support rod 42 is also threaded, and mounts a nut 44 and washer for supporting the bottom of the wall panel. Thus the means for attaching each of the wall panels to the latticework is disposed coaxially with and is operatively connected to one of the tie rods 21, and such that the weight of the suspended wall panels is borne directly by the tie rods and not by the latticework.

As will also be seen in FIG. 4 each wall panel 40 has a vertical height such that its lower edge is spaced above the bottom wall 12 of the clean room. Also, a sealing gasket 46 is disposed between the upper edge of the wall panel and the latticework to provide an effective seal therebetween, upon the tightening of the wall panel against the member of the latticework by means of the supporting nut 44 and washer. The wall panels may further incorporate a suitable number of doors 47 to facilitate access to the various enclosed areas by the technicians.

In order to seal the periphery of the latticework to the bounding side walls of the clean room, there is provided a flexible sealing strip 48 which is connected to the side walls 14 by means of a bracket 50, and which is joined to the latticework by a rigid plate 51 which is disposed in the sealant 30. The flexible strip 48 further serves to reduce the transmission of vibrations from the side walls 14 of the clean room to the latticework, and thus to the wall panels mounted within the clean room.

FIGS. 5-9 illustrate a second embodiment of the invention, wherein the wall panels 60 each comprise a supporting framework of interconnected horizontal and vertical channel members, and a number of sheet members 62 realeasably connected to and overlying the frame members. More particularly, the frame members comprise a top channel member 63 adapted to be aligned immediately below a lengthwise or crosswise member of the latticework 18, a bottom channel 64 member positioned immediately above the floor of the clean room, a number of vertical channel members 65 extending between the top and bottom members, and a stabilizing horizontal member 66 joining the vertical members. The vertical members 65 include oval shaped openings 69 at spaced locations along one side, and a clamping member 67 is inserted into each of these openings in the manner best seen in FIGS. 8-9. The sheet members 62 are provided with tab-like extensions 68 at spaced apart locations along each side edge and which correspond to the distance between the opening 69 of the vertical channel members 65.

Figure 8:
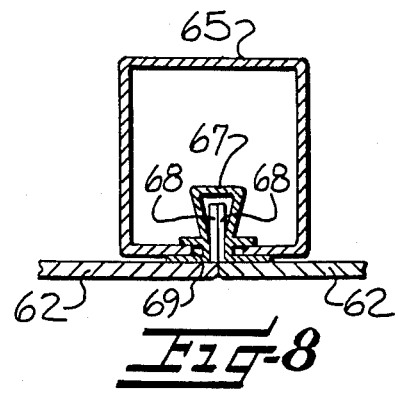
FIG. 8 is a sectional view taken substantially along the lines 8—8 of FIG. 7.
Figure 6:
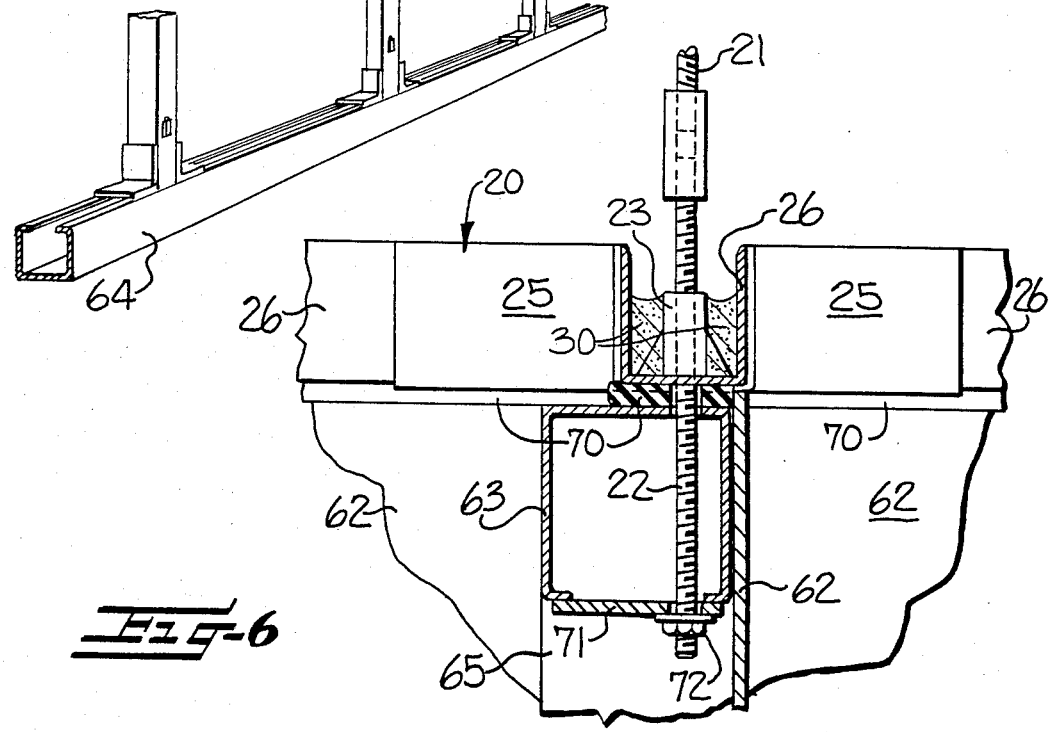
FIG. 6 is a fragmentary sectional view illustrating the interconnection between the wall panels of the embodiment of FIG. 5, and the latticework of the filter bank.

The top channel member 63 is adapted to be joined to the latticework, with a sealing gasket 70 disposed therebetween in the manner best shown in FIG. 6. In addition, the top channel member 63 includes an aperture for receiving the lower end portions 22 of the tie rods which extend through the connectors 20, and a load bearing plate 71, washer, and nut 72 are provided for securing the top channel member 63 to the latticework. The sheet members 62 are then releasably connected to the vertical frame members by inserting the tab-like extensions 68 into the corresponding clamping members 67, which are located within the openings 69 of the vertical frame members 65. As can be seen in FIG. 8, the tab-like extensions 68 of adjacent sheet members are located within the same clamping members, in order that the side edges of adjacent sheet members are in abutting relationship with each other.

As will be apparent from the above description, the partitioned clean room 10 of the present invention is characterized in that the wall panels 40, 60 are effectively isolated from external room vibrations by reason of the fact that the periphery of the latticework is isolated from the surrounding side walls 14 by means of the sealing strip 48, and the fact that the lower edges of the wall panels are spaced above the floor 12 of the clean room. Also, the partitioned areas are isolated from each other by means of the sealing gasket 46, 70 disposed between the latticework and the wall panels to prevent cross contamination. Further, it will be apparent that the wall panels may be readily moved to various locations within the clean room to provide separate work areas of desired configurations.

In the drawings and specification, there has been set forth a preferred embodiment of the invention, and although specific terms are employed, they are used in a generic and descriptive sense only and not for purposes of limitation.

That which is claimed is:

1. A clean room having provision for supplying filtered air vertically therethrough under substantially laminar flow conditions and characterized by the ability to be divided into separated work areas of variable configurations, and comprising a clean room enclosure including a top wall, a bottom wall, and bounding side walls, a filter bank positioned parallel to and spaced below said top wall, said filter bank comprising a supporting latticework composed of interconnected lengthwise and crosswise members which define a plurality of rectangular open areas, a plurality of supporting tie rods connected between said top wall of the clean room and said latticework, and a plurality of high efficiency air filters positioned on said latticework with one of the filters covering each of said open areas, a plurality of wall panels suspended downwardly from said latticework, with each wall panel being aligned below one of either said lengthwise or crosswise members of said latticework, and attachment means releasably supporting each of said wall panels, with each attachment means being disposed coaxially with and operatively connected to one of said tie rods, and such that the weight of the suspended wall panels is borne directly by said tie rods and not by said latticework, and whereby said wall panels may be positioned within said clean room in a selected configuration to define separated work areas.

2. A clean room according to claim 1 wherein the lower edge of each of said wall panels is spaced above said bottom wall of the clean room.

3. A clean room according to claim 1 further comprising sealing means disposed between said latticework and the upper edge of each of said wall panels for providing an air seal therebetween.

4. A clean room according to claim 1 wherein said tie rods each include an integral lower end portion which extends through said latticework, and wherein each of said attachment means is directly connected to respective ones of said lower end portions.

5. A clean room according to claim 4 wherein each of said attachment means comprises an elongate support rod coaxially disposed with the associated tie rod and connected to the lower end portion thereof, with each of said support rods extending through the full height of the associated wall panel, and load bearing means releasably connected to the lower end of each of said support rods and contacting the lower edge of the associated wall panel in order to support the same.

6. A clean room according to claim 4 wherein each of said wall panels comprises a supporting framework of elongate channel members, and a plurality of sheet members releasably connected to and overlying said channel members, and wherein the lower end portions of said tie rods extend through a top one of said channel members, and said attachment means comprises nut means attaching said top one of said channel members to said lower end portions of said tie rods.

7. A clean room according to claim 1 further comprising flexible sealing means disposed between the bounding side walls of the clean room and the periphery of said latticework for effecting an air seal therebetween and reducing the transmission of vibrations from the side walls to the filter bank and thus the wall panels.

8. A clean room having provision for supplying filtered air vertically therethrough under substantially laminar flow conditions and characterized by the ability to be divided into separate work areas of variable configurations, and comprising a clean room enclosure including a top wall, a bottom wall and bounding side walls, a filter bank positioned parallel to and spaced below said top wall, said filter bank comprising a supporting latticework which defines a plurality of rectangular open areas, said latticework including a plurality of generally X-shaped connectors disposed at the corners of the rectangular open areas, with each connector composed of four extensions radiating from a common central location at right angles to each other, a plurality of elongate channels interconnecting said X-shaped connectors, a plurality of supporting tie rods connected between said X-shaped connectors and said top wall of the clean room, and a plurality of high efficiency air filters positioned on said latticework with one of the filters covering each of said open areas, a plurality of wall panels suspended downwardly from said latticework, with each wall panel being aligned below selected ones of the elongate channels of the latticework, and attachment means releasably supporting each of said wall panels, with each attachment means being disposed coaxially with and operatively connected to one of said tie rods, and such that the weight of the suspended wall panels is borne directly by said tie rods and not by said latticework, and whereby said wall panels are positioned within said clean room in a selected configuration to define separated work areas.

9. A clean room according to claim 8 wherein said tie rods each include an integral lower end portion which extends through the associated X-shaped connector, and wherein said attachment means in directly connected to respective ones of said lower end portions.

10. A clean room according to claim 9 wherein the lower edge of each of said wall panels is spaced above said bottom wall of said clean room, and further comprising flexible means disposed between the bounding side walls of the clean room and the periphery of said latticework for effecting an air seal therebetween while reducing the transmission of vibrations.

11. A partitioned clean room having provision for supplying filtered air vertically therethrough under substantially laminar flow conditions and characterized in that the partitions are isolated from external room vibrations, and comprising a clean room enclosure including a top wall, a bottom wall, and bounding side walls, a filter bank positioned parallel to and spaced below said top wall, said filter bank comprising a supporting latticework which defines a plurality of rectangular open areas, a plurality of supporting tie rods connected between said top wall of the clean room and said latticework, and a plurality of high efficiency air filters positioned on said latticework with one of the filters covering each of said open areas, a plurality of wall panels suspended downwardly from said latticework, with the lower edge of each of said wall panels being spaced above said bottom wall of the clean room, attachment means releasably supporting each of said wall panels from said tie rods of said latticework whereby said wall panels may be positioned within said clean room in a selected configuration to define separated work areas, and flexible means disposed between the bounding side walls of the clean room and the periphery of said latticework for effecting an air seal therebetween and isolating the separated work areas, including said filter bank and wall panels, from external room vibrations.

12. The partioned clean room as defined in claim 11 further comprising sealing means disposed between said latticework and the upper edge of each of said wall panels for providing an air seal therebetween.

* * * * *